(12) United States Patent
Ewe et al.

(10) Patent No.: US 10,768,336 B2
(45) Date of Patent: Sep. 8, 2020

(54) FORMATION LOGGING USING MULTICOMPONENT SIGNAL-BASED MEASUREMENT OF ANISOTROPIC PERMITTIVITY AND RESISTIVITY

(71) Applicant: HALLIBURTON ENERGY SERVICES, INC., Houston, TX (US)

(72) Inventors: Wei-Bin Ewe, Singapore (SG);
Hsu-Hsiang Wu, Sugarland, TX (US);
Burkay Donderici, Houston, TX (US);
Roland E. Chemali, Humble, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 336 days.

(21) Appl. No.: 15/531,375

(22) PCT Filed: Dec. 31, 2014

(86) PCT No.: PCT/US2014/073052
§ 371 (c)(1),
(2) Date: May 26, 2017

(87) PCT Pub. No.: WO2016/108909
PCT Pub. Date: Jul. 7, 2016

(65) Prior Publication Data
US 2018/0003853 A1 Jan. 4, 2018

(51) Int. Cl.
*G01V 3/38* (2006.01)
*G01V 3/28* (2006.01)

(52) U.S. Cl.
CPC .............. *G01V 3/38* (2013.01); *G01V 3/28* (2013.01); *Y02A 90/344* (2018.01)

(58) Field of Classification Search
CPC ... G01V 3/38; G01V 3/28; G01V 3/00; G01V 2210/626; Y02A 90/344; E21B 44/00
See application file for complete search history.

(56) References Cited

U.S. PATENT DOCUMENTS

| 6,092,024 A | 7/2000 | Wu |
| 6,218,841 B1 * | 4/2001 | Wu .................. G01V 3/30 324/338 |

(Continued)

FOREIGN PATENT DOCUMENTS

| WO | 2011/129828 | 10/2011 |
| WO | 2014/011190 | 1/2014 |

OTHER PUBLICATIONS

PCT International Search Report and Written Opinion, dated Sep. 21, 2015, Appl No. PCT/US2014/073052, "Formation Logging Using Multicomponent Signal-Based Measurement of Anisotropic Permittivity and Resistivity," Filed Dec. 31, 2014, 16 pgs.

(Continued)

*Primary Examiner* — Mohammad K Islam
(74) *Attorney, Agent, or Firm* — Jason Sedano; C. Tumey Law Group PLLC

(57) ABSTRACT

Certain logging method and system embodiments obtain multi-component signal measurements from an electromagnetic logging tool conveyed along a borehole through a formation, and invert the measurements for a single frequency using an anisotropic formation model having at least dip, horizontal and vertical resistivity, and horizontal and vertical permittivity, as parameters. A resulting log is provided to represent a position dependence of at least one of said parameters or a formation property derived from at least one of said parameters. Illustrative formation properties include water saturation, rock type, and presence of pyrite or other such materials having anisotropic polarization. Inversions may be performed on measurements acquired at other frequencies to determine a representative dispersion curve for further characterization of the formation.

19 Claims, 6 Drawing Sheets

(56) References Cited

U.S. PATENT DOCUMENTS

| | | | | |
|---|---|---|---|---|
| 6,476,609 | B1* | 11/2002 | Bittar | G01V 3/30 |
| | | | | 324/338 |
| 6,502,036 | B2* | 12/2002 | Zhang | G01V 3/28 |
| | | | | 702/7 |
| 6,819,112 | B2 | 11/2004 | Gianzero et al. | |
| 9,176,252 | B2* | 11/2015 | Liang | G01V 3/28 |
| 9,547,102 | B2 | 1/2017 | Wu et al. | |
| 9,562,987 | B2* | 2/2017 | Guner | G01V 3/30 |
| 10,067,257 | B2* | 9/2018 | Homan | G01V 3/12 |
| 10,157,167 | B2* | 12/2018 | Wang | G01V 3/38 |
| 2003/0093223 | A1 | 5/2003 | Zhang et al. | |
| 2007/0061082 | A1* | 3/2007 | Seleznev | G01V 3/26 |
| | | | | 702/11 |
| 2009/0005994 | A1* | 1/2009 | Srnka | G01V 3/12 |
| | | | | 702/7 |
| 2010/0156424 | A1 | 6/2010 | Bittar et al. | |
| 2012/0199394 | A1* | 8/2012 | Bittar | G01V 3/28 |
| | | | | 175/45 |
| 2013/0046474 | A1* | 2/2013 | Bittar | G01V 3/10 |
| | | | | 702/7 |
| 2013/0105224 | A1 | 5/2013 | Donderici et al. | |
| 2014/0032116 | A1* | 1/2014 | Guner | G01V 3/28 |
| | | | | 702/6 |
| 2015/0032375 | A1* | 1/2015 | Bertrand | G01V 13/00 |
| | | | | 702/7 |
| 2016/0054467 | A1* | 2/2016 | Li | G01V 3/18 |
| | | | | 702/7 |
| 2016/0124108 | A1* | 5/2016 | Wu | G01V 3/38 |
| | | | | 702/7 |

OTHER PUBLICATIONS

Anderson, Barbara I. et al., "Observations of Large Dielectric Effects on Induction Logs, or, Can Source Rocks be Detected with Induction Measurements?," SPWLA 47$^{th}$ Annual Logging Symposium, Jun. 4-7, 2006, 12 pgs.

Chemali, Roland et al., "Comparisons of Wireline and LWD Resistivity Highlight Resistivity Frequency Dispersion in Sedimentary Formations," SPWLA 36$^{th}$ Annual Logging Symposium, Jun. 26-29, 1995, 12 pgs.

Clavier, C. et al., "Effect of Pyrite on Resistivity and Other Logging Measurements," SPWLA Seventeenth Annual Logging Symposium, Jun. 9-12, 1976, 34 pgs.

Luling, Martin G. et al., "Dielectric Effects on Resistivity Anisotropy in Laminates—or—When is Rv < Rh?," SPWLA 46$^{th}$ Annual Logging Symposium, Jun. 26-29, 2005, 16 pgs.

Ramus, John C. et al., "Resistivity Dispersion—Fact or Fiction?," SPWLA 44$^{th}$ Annual Logging Symposium, Jun. 22-25, 2003, 14 pgs.

Wang, Hamming et al., "The Broadband Electromagnetic Dispersion Logging Data in a Gas Shale Formation: A Case Study," SPWLA 54$^{th}$ Annual Logging Symposium, Jun. 22-26, 2013, 12 pgs.

* cited by examiner

FIG. 4B  • Positive Ion  ▨ Grain  ▢ Oil  ▢ Brine
         ∘ Negative Ion

FORMATION LOGGING USING MULTICOMPONENT SIGNAL-BASED MEASUREMENT OF ANISOTROPIC PERMITTIVITY AND RESISTIVITY

BACKGROUND

In the field of petroleum well drilling and logging, resistivity logging tools are frequently used to provide an indication of the electrical resistivity of rock formations surrounding an earth borehole. (Such information regarding resistivity is useful in ascertaining the presence or absence of hydrocarbons.) A typical electromagnetic resistivity logging tool includes a transmitter antenna and multiple receiver antennas located at different distances from the transmitter antenna along the axis of the tool. The transmitter antenna creates electromagnetic fields in the surrounding formation, which in turn induce a voltage in each receiver antenna. Due to geometric spreading and absorption by the surrounding earth formation, the induced voltages in the receiving antennas have different phases and amplitudes.

Experiments have shown that the phase difference (D) and amplitude ratio (attenuation, A) of the induced voltages from any two receiver antennas are indicative of the resistivity of the formation. The depth of investigation (as defined by an averaged radial distance from the tool axis) to which such a resistivity measurement pertains is a function of the frequency of the transmitter and the distance from the transmitter to the mid-point between the two receivers. Thus, one may achieve multiple radial depths of investigation of resistivity either by providing multiple transmitters at different distances from the receiver pair or by operating a single transmitter at multiple frequencies, or both.

Many formations are electrically anisotropic, a property which is generally attributable to fine layering during the sedimentary build-up of the formation. Hence, in a formation coordinate system oriented such that the x-y plane is parallel to the formation layers and the z axis is perpendicular to the formation layers, resistivities $R_x$ and $R_y$ in directions x and y, respectively, are the same, but resistivity $R_z$ in the z direction may be different from $R_x$ and $R_y$. Thus, the resistivity in a direction parallel to the plane of the formation (i.e., the x-y plane) is known as the horizontal resistivity, $R_h$, and the resistivity in the direction perpendicular to the plane of the formation (i.e., the z direction) is known as the vertical resistivity, $R_v$. One measure of formation anisotropy is the index of anisotropy, which is defined as $\eta=[R_v/R_h]^{1/2}$.

The relative dip angle, $\theta$, is the angle between the tool axis and the normal to the plane of the formation. Resistivity anisotropy and relative dip angle each have significant effects on resistivity logging tool measurements. As a result, resistivity logging systems should account for formation anisotropy and relative dip if accurate resistivity logs are to be obtained. To facilitate the determination of the anisotropic resistivity parameters ($R_h$, $R_v$, and $\theta$), at least one of the transmit or receive antennas is tilted or oriented transversely to the tool axis to introduce an azimuthal sensitivity, and in practice it is becoming common to configure multiple ones of the transmitter and receiver antennas as multi-component antennas. Moreover, at least some multi-component resistivity logging systems also acquire measurements using multiple signal frequencies.

Often, an inversion process is employed to derive the formation parameters from the resistivity tool measurements. In an inversion process, the tool measurements are compared to synthetic measurements derived from a parameterized formation model, and the model parameters are adjusted until the synthetic measurements match the tool measurements. Though the increased number of measurements offered by multi-spacing, multi-frequency, and multi-component logging tools creates the potential for increased model complexity and improved characterization accuracy, the large parameter space associated with unduly complex models renders them computationally infeasible and prone to numerical errors from unnecessary parameters.

Thus, when the existing inversion processes fail to accurately characterize certain formations, it is often unwise to pursue the conventional approach of merely increasing the number of model parameters and/or increasing the number of measurements being operated on by the inversion process. Rather, a more selective approach is called for.

BRIEF DESCRIPTION OF THE DRAWINGS

Accordingly, there are disclosed herein specific formation logging systems and methods that invert single-frequency or multi-frequency multicomponent signal measurements using a formation model that includes anisotropic permittivity parameters. In the drawings:

FIG. 4B is a schematic representation of grain-shape effects on ion mobility.

Figure 1:
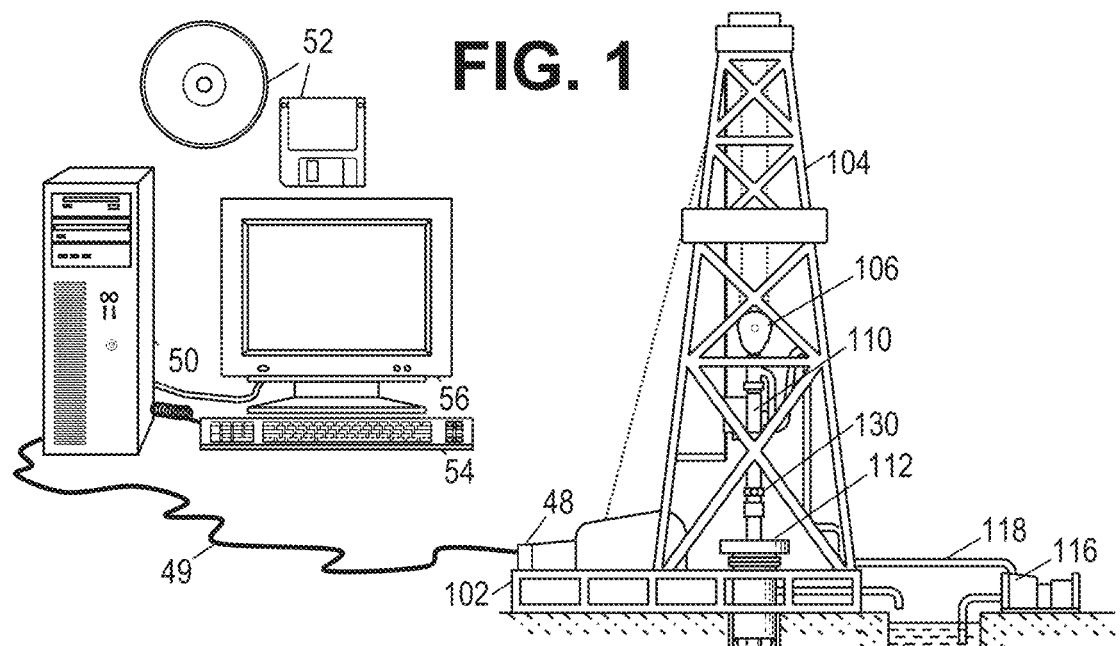
FIG. 1 is a schematic illustration of a logging while drilling (LWD) environment.

It should be understood, however, that the specific embodiments given in the drawings and detailed description thereto do not limit the disclosure. On the contrary, they provide the foundation for one of ordinary skill to discern the alternative forms, equivalents, and modifications that are encompassed together with one or more of the given embodiments in the scope of the appended claims.

DETAILED DESCRIPTION

The following disclosure provides electromagnetic logging systems and methods using a formation model that efficiently provides enhanced inversion accuracy by accounting for anisotropic formation permittivity. With such accounting, the inversion can be performed using measurements at a single frequency, though some embodiments employ single-frequency inversion at each of multiple measurement frequencies to obtain a dispersion curve for the formation, and still other embodiments employ simultaneous multi-frequency, multi-component inversion while accounting for anisotropic formation permittivity. The inversion parameters include formation dip, anisotropic resistivity ($R_h$, $R_v$), and anisotropic permittivity ($\epsilon_h$, $\epsilon_v$), enabling fluid saturations and rock types to be determined even in the presence of anomalies such as pyrite deposits and other sources of Maxwell-Wagner polarization.

FIG. 1 shows a suitable context for describing the operation of the disclosed systems and methods. In the illustrated logging while drilling (LWD) environment, a drilling platform 102 is equipped with a derrick 104 that supports a hoist 106 for raising and lowering a drill string 108 through the well head 112. A top drive 110 rotates the drill string 108 to drill the borehole as far as the length of the drill string allows. The drill string 108 is periodically extended by temporarily anchoring the drill string 108 at the well head 112 and using the hoist 106 to position and attach new drill pipe sections with threaded connectors 107.

Connected to the lower end of the drill string 108 is a drill bit 114. As the drill bit 114 rotates, it creates a borehole 120 that passes through various formations 121. A pump 116 circulates drilling fluid through a supply pipe 118 to top drive 110, through the interior of drill string 108, through orifices in drill bit 114, back to the surface via the annulus around drill string 108, and into a retention pit 124. The drilling fluid transports cuttings from the borehole into the pit 124 and aids in maintaining the integrity of the borehole 120.

Drilling fluid, often referred to in the industry as "mud", is often categorized as either water-based or oil-based, depending on the solvent. Oil-based muds are generally preferred for drilling through shaley formations, as water-based muds have been known to damage such formations.

An electromagnetic logging tool 126 is integrated into the bottomhole assembly 129 near the drill bit 114. The electromagnetic logging tool 126 may take the form of a drill collar, i.e., a thick-walled tubular that provides weight and rigidity to aid the drilling process. As the drill bit 114 extends the borehole 120 through the formations, the electromagnetic logging tool 126 (possibly in cooperation with other sensors in the bottomhole assembly 129) collects multicomponent signal measurements and measurements of the tool orientation and position, borehole size, drilling fluid resistivity, and various other drilling conditions.

The orientation measurements may be performed using an orientation indicator, which may include magnetometers, inclinometers, and/or accelerometers, though other sensor types such as gyroscopes may be used. Preferably, the orientation indicator includes a 3-axis fluxgate magnetometer and a 3-axis accelerometer. As is known in the art, the combination of those two sensor systems enables the measurement of the rotational ("toolface") angle, borehole inclination angle (aka "slope"), and compass direction ("azimuth"). In some embodiments, the toolface angle and borehole inclination are calculated from the accelerometer sensor output. The magnetometer sensor outputs are used to calculate the borehole azimuth. With the toolface angle, the borehole inclination, and the borehole azimuth information, the electromagnetic logging tool measurements can be used to steer the bit to and along the desired formation layer.

In wells employing acoustic telemetry for LWD, the electromagnetic logging tool 126 and other downhole sensors are coupled to the telemetry module 128 having an acoustic telemetry transmitter that transmits telemetry signals in the form of acoustic vibrations in the tubing wall of drill string 108. An acoustic telemetry receiver array 130 may be coupled to tubing below the top drive 110 to receive transmitted telemetry signals. One or more repeater modules 132 may be optionally provided along the drill string to receive and retransmit the telemetry signals. Alternative LWD telemetry techniques exist and can be employed, including mud pulse telemetry, electromagnetic telemetry, and wired drillpipe telemetry. Many telemetry techniques also offer the ability to transfer commands from the surface to the bottomhole assembly 129, thereby enabling adjustment of the tool's configuration and operating parameters. In some embodiments, the telemetry module 128 also or alternatively stores measurements for later retrieval when the bottomhole assembly 129 returns to the surface.

A drilling equipment interface 48 facilitates communication between the surface components of the telemetry system and a processing system 50, shown here in the form of a desktop computer coupled to the drilling equipment interface 48 via a cable 49. In other embodiments, the processing system 50 may be a tablet, laptop computer, a remote processing center, or even a virtual computer, any of which may be coupled to retrieve the logging tool measurements via a computer network and/or a wireless communications link. Software (shown in FIG. 1 as portable information storage media 52), once loaded into internal memory and executed by the processor(s), configures the processing system 50 to derive estimated formation parameters from the logging tool measurements and to responsively provide a visual representation of the estimated parameters on a display 56, a printer, or other device for providing a perceptible output. A keyboard 54 or other input device enables a user to interact with the processing system and thereby achieve at least some control of the displayed information to facilitate a greater understanding of the presented information. Normally the formation parameter estimates are presented as formation logs having multiple tracks, each track displaying a formation parameter's dependence on depth or borehole position.

Figure 2:
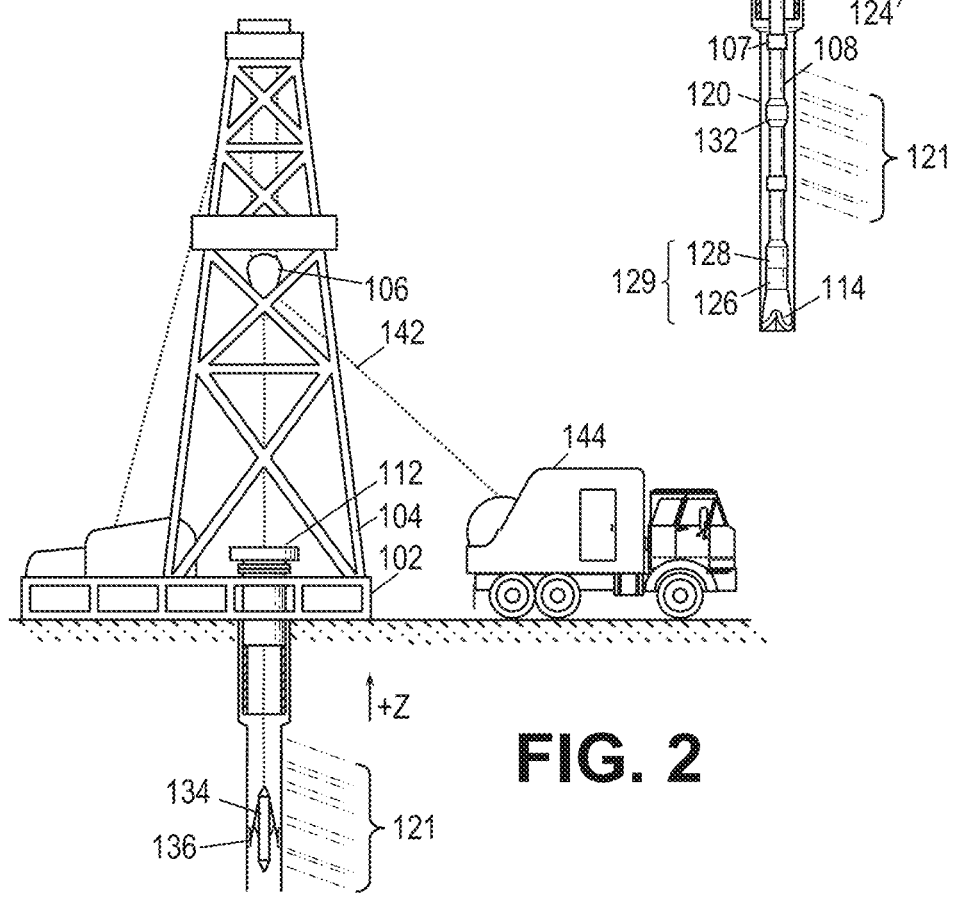
FIG. 2 is a schematic illustration of a wireline logging environment.

At various times during the drilling process, the drill string 108 is removed from the borehole as shown in FIG. 2. Once the drill string has been removed, logging operations can be conducted using a wireline logging tool 134, i.e., a sensing instrument sonde suspended by a cable 142 having conductors for transporting power to the tool and telemetry from the tool to the surface. An electromagnetic logging portion of the logging tool 134 may have centralizing arms 136 that center the tool within the borehole as the tool is pulled uphole. A logging facility 144 collects measurements from the logging tool 134, and includes a processing system 50 for processing and storing the measurements gathered by the logging tool.

Figure 3A:
FIG. 3A is a schematic depiction of an illustrative antenna configuration for an electromagnetic wireline tool.

FIG. 3A shows an illustrative electromagnetic wireline logging tool 134 having antennas for acquiring multicomponent signal measurements as a function of position along the borehole. A multi-component transmit antenna 302 includes three orthogonal antennas that can be operated in sequence to generate electromagnetic fields in the surrounding formation, the propagation and attenuation of those fields varying in accordance with the electrical characteristics of the formation. Axial antennas 304, 306, and/or multicomponent receive antennas 308, 310, 312, 314, enable multiple measurements of each of the resulting fields. The transmit-receive antenna spacings are design parameters that may be adjusted by the manufacturer in accordance with the desired measurement resolution and depth of investigation for the tool. The tool may acquire attenuation and phase measurements of each receive antenna's response to transmit antenna 302. In certain alternative embodiments, the tool measures in-phase and quadrature-phase components of the receive signals rather than measuring amplitude and phase. In either case, these measurements are collected and stored as a function of the tool's position and rotational orientation in the borehole.

Figure 3B:
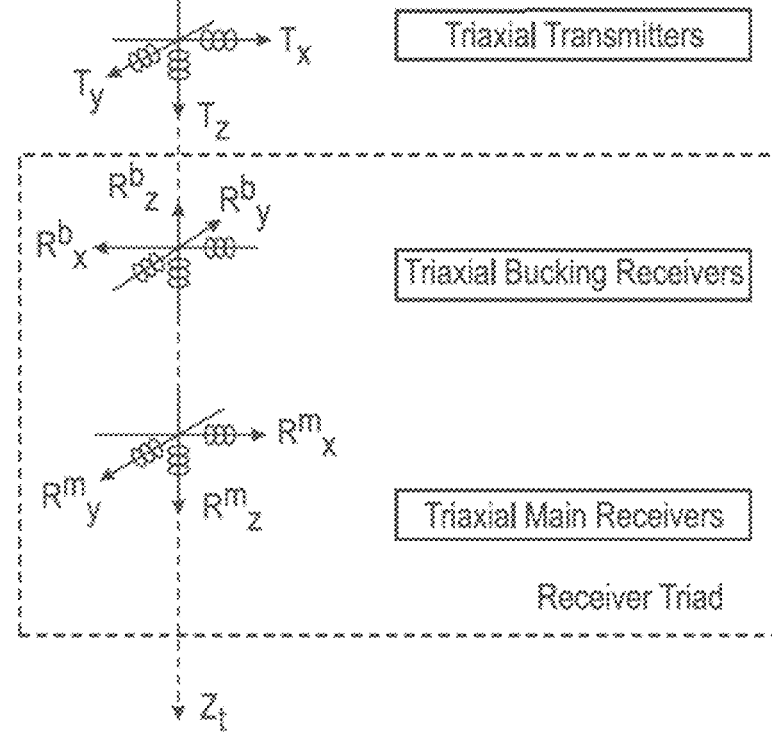
FIG. 3B is a simplified schematic representation of a multicomponent transmit-receive antenna arrangement.

The illustrated tool has receive antennas 304 and 306 coaxial with the tool, making them parallel to the Z-axis component of the transmit antenna 302. Each multicomponent receive antenna 308-314 is, in accordance with the model shown in FIG. 3B, oriented to maintain each of its components parallel to the corresponding component of the transmit antenna 302. Each component of the multicomponent receive antenna includes a main coil and a bucking coil each oriented parallel to the corresponding transmitter coil, and spaced apart along the tool's axis. In FIG. 3B, the orthogonal triad of transmitter coils $T_x$, $T_y$, $T_z$, represent magnetic dipole antennas oriented parallel to the tool's X, Y, and Z axes respectively (the tool's coordinate system). An orthogonal triad of main receiver coils $R_x^m$, $R_y^m$, $R_z^m$ similarly represent magnetic dipole antennas oriented along these axes, as do a triad of bucking receiver coils $R_x^b$, $R_y^b$, $R_z^b$. The tool dimensions and antenna spacings are subject to a great deal of variation depending on the desired tool properties. The distance between the main receive and bucking coils may be on the order of 0.25 m, while the spacing of the transmit coil to the midpoint between the main receive and bucking coil pairs may vary from about 0.4 m to over 10 m.

Figure 3C:
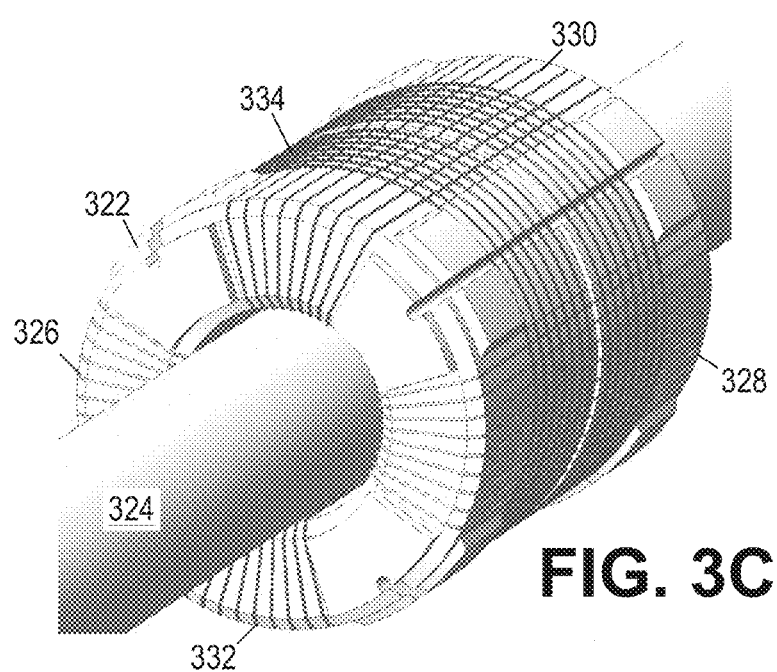
FIG. 3C is a perspective view of an illustrative triaxial antenna.

In the illustrative tool embodiments, each of the antennas surrounding the tool is mounted in a recess and protected by a non-conductive filler material and/or a shield having apertures of a non-conductive material. The tool body may be primarily composed of a highly conductive material, such as steel. As shown in FIG. 3C, the antenna coil triads may each be wound on a winding form 322 around an inner tubular 324. The inner tubular houses the tool electronics and wiring. Sensitivity to magnetic fields along an X-axis is provided by two coils 326, 328, while sensitivity along a Y-axis is provided by two coils 330, 332. A co-axial coil 334 provides sensitivity along a Z-axis. Other triaxial antenna configurations are also suitable and may be employed.

Returning to FIG. 3B, the main receiver triad is spaced at a distance $L_m$ from the transmitter triad, and the bucking receiver triad is spaced at a distance $L_b$ from the transmitter triad. The signal measurements of each coil in the bucking receiver triad can be subtracted from the corresponding coil in the main receiver triad to eliminate the direct field signal from the transmitter and thereby increase sensitivity to formation properties. As explained by Moran and Gianzero, in "Effects of Formation Anisotropy on Resistivity Logging Measurements" Geophysics, Vol. 44, No. 7, p. 1266 (1979), the magnetic field h in the receiver coils with a given signal frequency can be represented in terms of the magnetic moments m at the transmitters and a coupling matrix C:

$$h = Cm \qquad (1)$$

In express form, equation (1) is:

$$\begin{bmatrix} H_x \\ H_y \\ H_z \end{bmatrix} = \begin{bmatrix} C_{xx} & C_{xy} & C_{xz} \\ C_{yx} & C_{yy} & C_{zz} \\ C_{zx} & C_{zy} & C_{zz} \end{bmatrix} \begin{bmatrix} M_x \\ M_y \\ M_z \end{bmatrix}, \qquad (2)$$

where $M_X$, $M_Y$, and $M_Z$ are the magnetic moments (proportional to transmit signal strength) created by transmitters $T_X$, $T_Y$, and $T_Z$, respectively. $H_X$, $H_Y$, $H_Z$ are the magnetic fields (proportional to receive signal strength) at the receiver antennas $R_X$, $R_Y$, and $R_Z$, respectively.

In the antenna configuration of FIG. 3B, if each transmitter is fired in turn, and signal measurements are made at each receiver in response to each firing, nine differential measurements $(T_j R_i^m - T_j R_i^b, i,j \in \{x,y,z\})$ are obtained. These nine frequency-dependent transmit-receive antenna coupling measurements enable the determination of a complete coupling matrix C. ($C_{ij} = a_{ij} V_{ij}$, where i is the index for receiver axis x, y, z, and j is the index for transmitter axis x, y, z, $a_{ij}$ is a constant determined by the tool design, and $V_{ij}$ is a complex value representing the signal amplitude and phase shift measured by receiver i in response to the firing of transmitter j.) Thus for each signal frequency and antenna spacing employed, the measured voltage tensor can be expressed:

$$\overline{V} = (V_{ij})_{(3\times3)} = \begin{pmatrix} V_{xx} & V_{xy} & V_{xz} \\ V_{yx} & V_{yy} & V_{zz} \\ V_{zx} & V_{zy} & V_{zz} \end{pmatrix}. \qquad (3)$$

As in conventional induction logging, the elements of the measured voltage tensor can often be calibrated into an apparent conductivities to obtain the following apparent-conductivity tensor expression:

$$\overline{\sigma_a} = (\sigma_{ij})_{(3\times3)} = \begin{pmatrix} \sigma_{xx} & \sigma_{xy} & \sigma_{xz} \\ \sigma_{yx} & \sigma_{yy} & \sigma_{zz} \\ \sigma_{zx} & \sigma_{zy} & \sigma_{zz} \end{pmatrix}. \qquad (4)$$

As with the coupling matrix elements, the apparent conductivities are each related to the corresponding measured voltage tensor elements via a calibration factor $K_{ij}$:

$$\sigma_{ij} = K_{ij} V_{ij}, \qquad (5)$$

where $K_{ij}$ are the calibration factors as determined by a calibration experiment. With a tool design that employs collocated transmit antennas and collocated receive antennas, the calibration factors for a given transmit-receive antenna subarray usually satisfy the following relations:

$$K_{xx} = K_{yy} = K_{xy} = K_{yx} \qquad (6a)$$

$$K_{xz} = K_{yz} = K_{zx} = K_{zy} \qquad (6b)$$

yielding only three independent calibration factors per frequency: $K_{xx}$, $K_{zz}$, and $K_{xz}$. Calibration may be done in such a way that the conductivity reading of the tool in homogeneous formation without the borehole would match the true conductivity of the formation.

As with the voltage measurements, the coupling matrix elements may be complex valued. The coupling matrix elements may be expressed:

$$\sigma = \sigma_r + j\omega\varepsilon_0\varepsilon_r \qquad (7)$$

where $\sigma_r$ is the real-valued component of the apparent conductivity, $\omega$ is the angular frequency, $\varepsilon_0$ is the vacuum permittivity, and $\varepsilon_r$ is the formation's relative permittivity (also known as the dielectric constant). In a horizontally laminated formation, the effective horizontal conductivity is a volumetric average of the layer conductivities, but the effective vertical conductivity is an inverted volumetric average of the layers' inverse conductivities. The inversions cause the permittivity to affect the tool's measurement of the vertical conductivity's real-valued component, particularly at frequencies above about 100 kHz.

While conductivity and resistivity are not interchangeable (their values are inverses of each other), they are treated herein as functional equivalents because knowledge of either one dictates the value of the other. Whether the tool measurements are expressed in terms of a coupling matrix, a measured voltage tensor, an apparent conductivity tensor, or the equivalent resistivity values, they are herein referred to as multicomponent signal measurements, and they are expected to have frequency dependences that may be herein referred to as dispersion curves. (The term "dispersion curve" includes frequency dependence of either or both conductivity and permittivity values.)

Figure 3D:
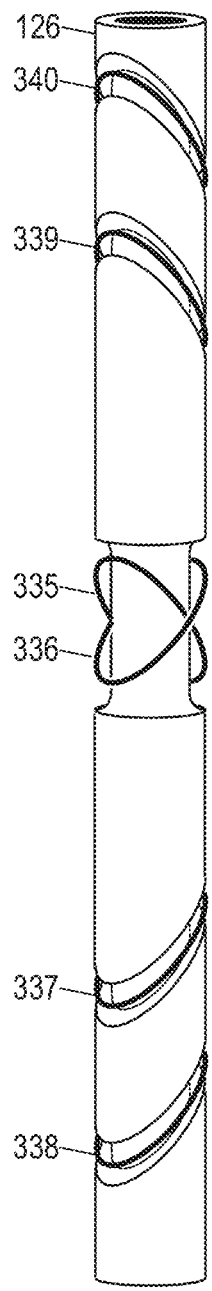
FIG. 3D is a schematic depiction of an illustrative tilted antenna configuration for an electromagnetic LWD tool.

The triaxial antennas shown in FIGS. 3A-3C are shown for explanatory purposes; they are not required to obtain the described multicomponent signal measurements. For example, FIG. 3D shows an illustrative tilted antenna LWD tool 126 that when rotated, acquires measurements from which the orthogonal multicomponent signal measurement values can be determined. Tilted receiver antennas 335 and 336 are co-located and tilted about 45° in opposite azimuthal directions. A first pair of transmitter coils 337 and 339 are equally spaced in opposite directions from the receiver antennas by about 32 inches, and a second pair of transmitter coils 338 and 340 are equally spaced in opposite directions from the receiver antennas by about 48 inches. The transmitter coils in each pair are tilted in opposite azimuthal directions. Further details about the operation and processing performed by the illustrative tool can be found in international application WO 2011/129828 A1 "Processing and geosteering with a rotating tool" by inventors Michael Bittar, Hsu-Hsiang Wu, and Shanjun Li. Other suitable logging tool antenna configurations may be employed to obtain the multicomponent signal measurements. The obtained multicomponent signal measurements need not include the full 3×3 apparent-conductivity tensor, as certain subsets will suffice for the inversion process using a decoupled voltage tensor from the tool azimuthal measurements of the two tilted receiver antennas 335 and 336 in response to one of the transmitter coils (detailed processing methods in WO 2011/129828). Specifically, the three direct-coupling signal measurements (XX, YY, ZZ) together with at least two cross-coupling signal measurements (e.g., XZ and YZ) are believed to be sufficient for inversion of the dip, anisotropic resistivity, and anisotropic permittivity. These signal measurements can be derived from the azimuthal measurements of the two tilted receivers.

Figure 3E:
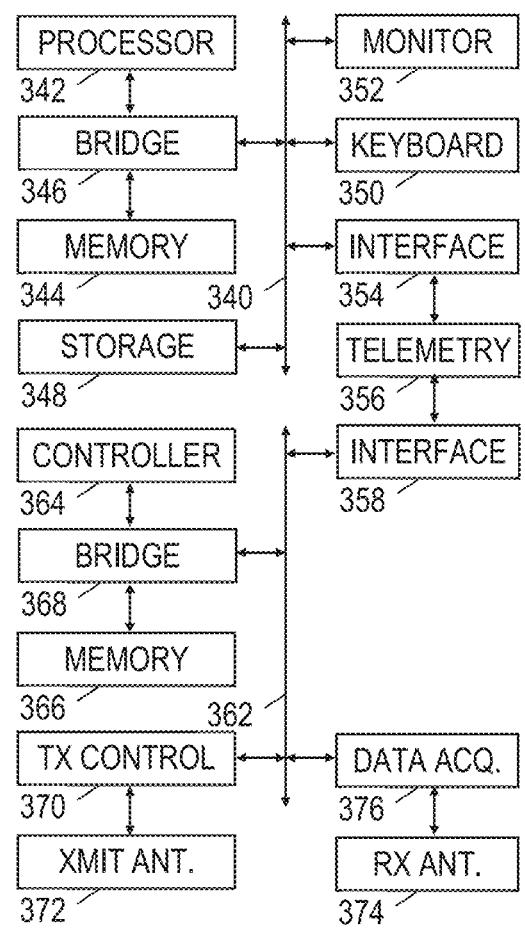
FIG. 3E is a function block diagram of an illustrative electromagnetic logging system.

FIG. 3E is a function block diagram of an illustrative logging system that includes the illustrative electromagnetic logging tool 126, 134 or a suitable replacement that can provide the needed multicomponent signal measurements. A processing system (e.g., processing system 50 in FIG. 1) includes a processor 342 coupled via a bridge 346 to a system bus 340 and a memory 344 having logging and inversion software. The bus 340 enables the processor 342 to access and control the various other system components so that as the processor 342 executes the software, the processor 342 is responsively able to, among other things, interact with a user via a keyboard or other input device 350 and a monitor or other output device 352. A nontransient information storage medium 348 (such as a magnetic disk or solid state drive) supplements the memory 344 to provide long term storage of the software and data where the processor 342 can readily access it.

The software configures the processor 342 to obtain data from the electromagnetic logging tool for inversion to estimate formation parameters and display them to a user in the form of formation logs. The processor 342 accesses the data using an interface 354 (such as a network interface card) that is coupled via any of the previously mentioned telemetry systems 356 to a downhole tool interface 358.

In the electromagnetic logging tool, a tool controller 364 is coupled by a bridge 368 to a tool memory 366 and a tool bus 362. The tool bus 362 enables the controller 364 to access and control the various other system components so that as the controller executes software in memory 366, the software configures the controller to respond to commands received via the interface 358, to obtain measurements, and to communicate those measurements to via the interface 358 to the uphole portion of the system. To obtain measurements, the controller 364 configures and enables the transmit unit 370, which in turn drives transmit antennas 372 in a suitable fashion to transmit electromagnetic signals into the surrounding formations. The controller 364 further configures and enables the data acquisition unit 376 to digitize and store measurements of signals detected via receive antennas 374. The controller 364 may perform in-situ processing of the measurements to reduce demands on storage and telemetry bandwidth. Such processing may include the determination of the apparent conductivities as given in equations 4 & 5 above.

Figure 4A:
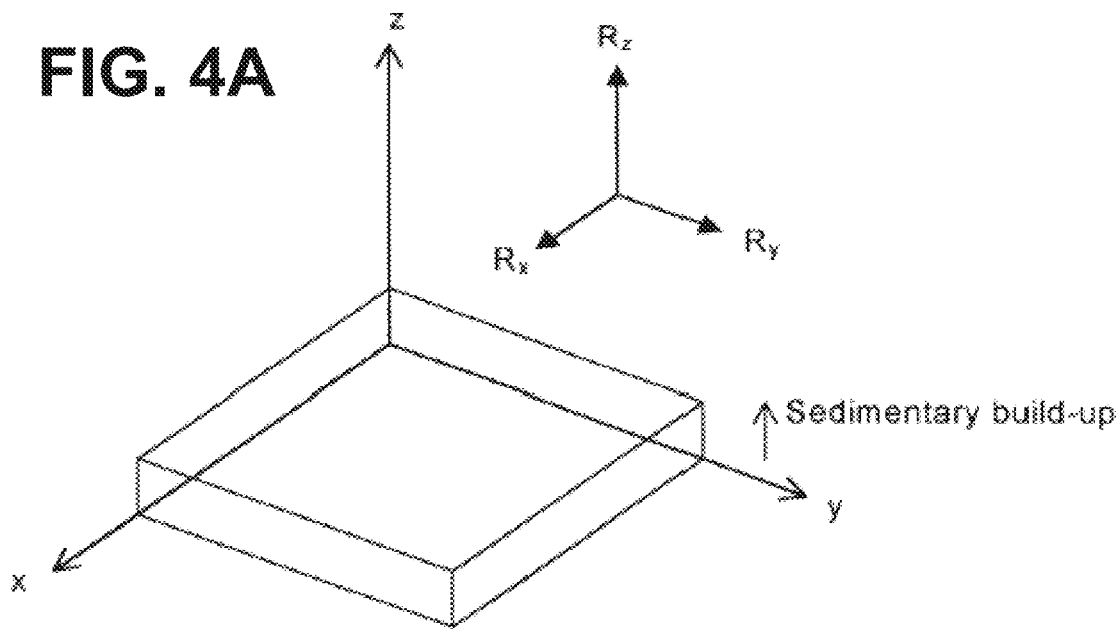
FIG. 4A is a schematic representation of the coordinate axes for a sedimentary earth formation.
Figure 4A:
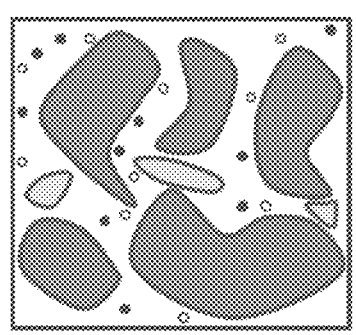
Figure 4A:
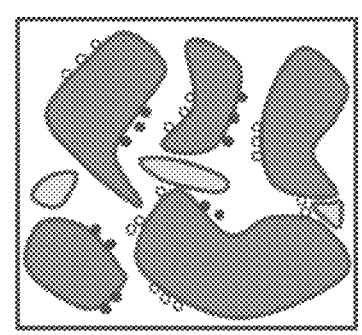

Referring momentarily back to FIGS. 1 and 2, note that formations 121 are not perpendicular to the borehole, a situation that may occur naturally or may occur due to directional drilling operations. When measuring formation resistivity and orientation, it is convenient to use the formation coordinate system shown in FIG. 4A. FIG. 4A shows a portion of a sedimentary formation bed, with the z-axis oriented perpendicular to the plane of the formation, i.e., in the direction of the sedimentary accretion. The formation resistivity when measured along this axis is often different than formation resistivity measured in the x-y plane. In a dipping bed, the x-axis may be chosen to be oriented in the direction of deepest ascent ("uphill"), or deepest descent ("downhill"). In a horizontal bed, the x-axis may be chosen to be oriented north.

The sedimentary accretion often leads to the formation of fine layers. Where the grains have aspect ratios that deviate significantly from unit, gravity causes them to deposit in a preferentially oriented fashion having the lowest center of gravity. The electrical characteristics of such layered, oriented-grain materials may be decidedly anisotropic.

FIG. 4B demonstrates the Maxwell-Wagner polarization effect, which is common in organic shale formations having clay, silica, feldspar, carbonates, iron oxide, pyrite, and other such organic materials. The effect arises from the impaired mobility of fluid ions in the presence of relative non-permeable grains. In the absence of an electrical field, the positive and negative ions in the ground water (brine) distribute themselves relatively uniformly. In the presence of an electrical field, the positive and negative ions move in opposite directions until they reach a grain or an interface with another fluid. The separation enforced between the ions affects the strength of the electrical field, and hence, the permittivity of the material. As the dimensions of oriented grains are different in different directions, the enforced separation between ions is also different, causing the permittivity to be a function of the direction in which the electric field is imposed. Moreover, the inertia of the ions limits how fast they can move, causing the permittivity to also be a function of the electromagnetic field's frequency.

Figure 5:
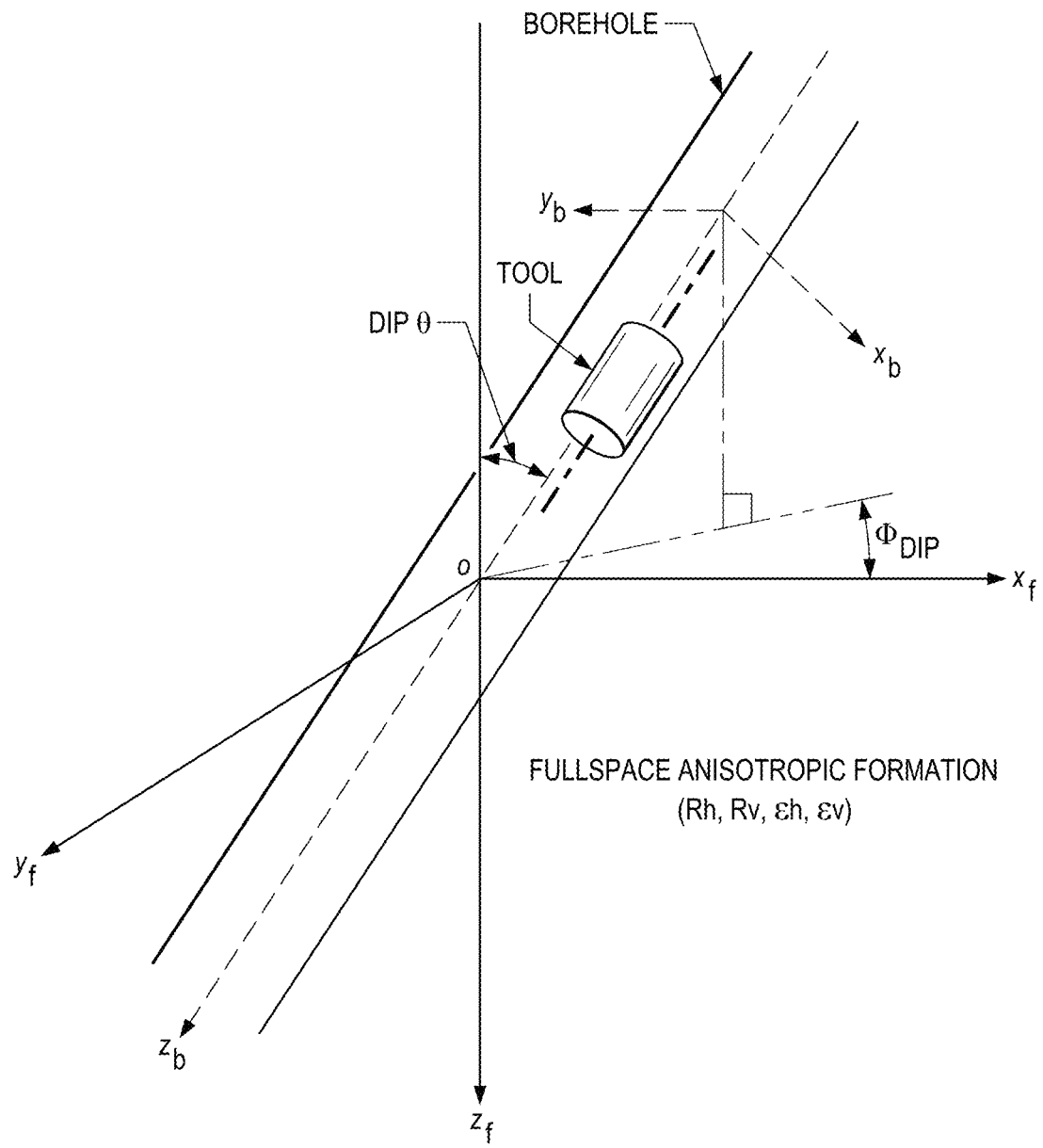
FIG. 5 is a schematic representation of a formation model with anisotropic permittivity.

In addition to the tool coordinate system and the formation coordinate system described above, a third coordinate system is employed herein. As shown in FIG. 5, the borehole coordinate system has a z-axis that follows the central axis of the borehole. The x-axis of the borehole extends perpendicularly from the central axis through the low side of the borehole. (In a vertical borehole, the x-axis extends through the north side of the borehole.) The y-axis extends perpendicular to the other two axes in accordance with the right-hand rule. The borehole coordinate system is related to the tool coordinate system in that their z-axes are aligned (though possibly offset). The orientation sensors measure the rotation of the tool's x- and y-axes relative to those of the borehole, enabling the tool's coupling measurements to be readily translated into the borehole's coordinate system.

The borehole coordinate system can be related to the formation coordinate system with two parameters, dip θ and strike φ. In addition to these two parameters, an anisotropic formation model may include horizontal resistivity $R_h$, vertical resistivity $R_v$, horizontal permittivity $\in_h$, and vertical permittivity $\in_v$. The parameters may be equivalently expressed in terms of resistivity ratio (resistivity anisotropy); a permittivity ratio (permittivity anisotropy); $R_h$ or $R_v$; and $\in_h$ or $\in_v$. Some models may further include an eccentricity distance $d_{ecc}$ and an eccentricity azimuth $\phi_{ecc}$ to account for the distance and direction by which the tool is offset from the borehole axis. The models may additionally or alternatively include parameters for the borehole diameter $D_{hole}$ and optionally the invaded region diameter $D_{inv}$. (The invaded region is a region around the borehole where the borehole fluid has altered the resistivity from that of the native formation.) Other potential parameters include bed boundary positions, with the remaining parameters being allowed to assume different values for each bed.

Figure 6:
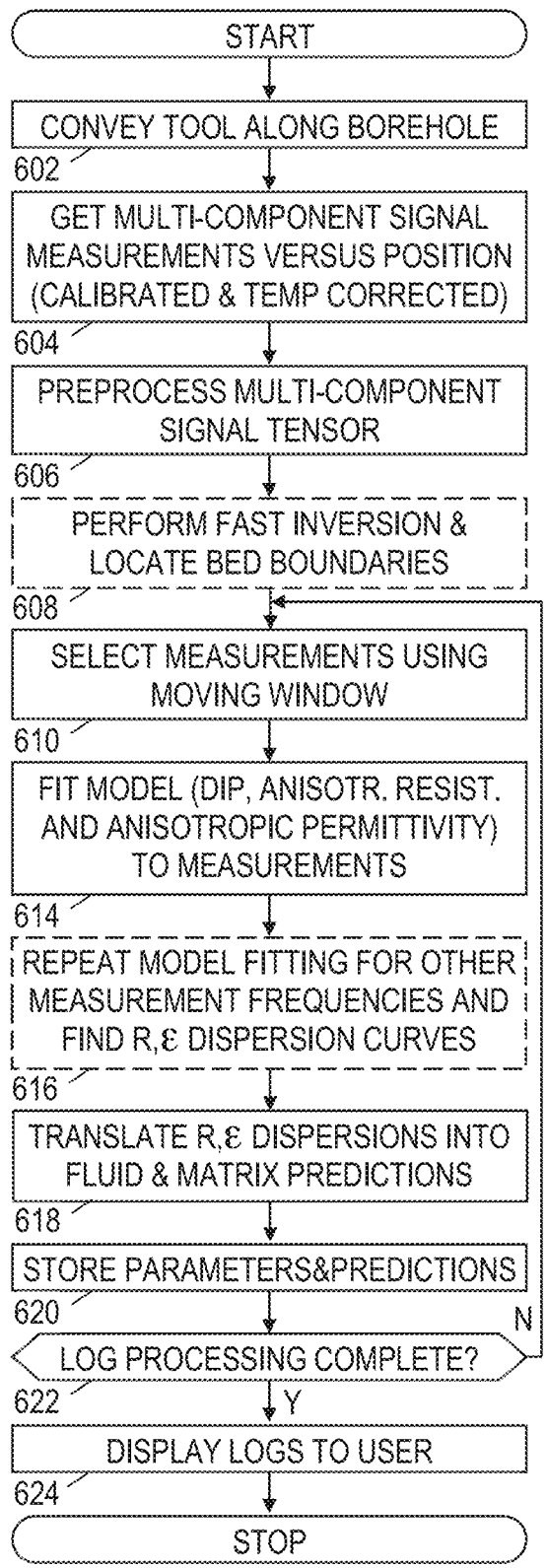
FIG. 6 is a flow diagram of an illustrative formation logging method.

FIG. 6 is a flow diagram of an illustrative formation logging method. The illustrated method may be implemented by the systems illustrated in FIGS. 1, 2, and 3E. Alternatively, systems such as those illustrated in FIGS. 1, 2, and 3E may acquire the data and communicate it to a remote workstation where the remaining portion of the illustrative method is carried out.

The logging method begins in block 602 with the conveyance of a multi-component induction logging tool along a borehole, e.g., as a wireline tool or a LWD tool. In block 604, as the tool is being conveyed along the borehole, it obtains multi-component signal measurements for each of the antenna arrays and signal frequencies as a function of the tool's position in the borehole. Tool calibration and temperature correction are normally applied during or shortly after the measurements are acquired. In at least some cases, the logging tool assembly further includes instruments to measure borehole diameter ($d_{hole}$) and borehole fluid resistivity $R_{hole}$.

In block 606, the system preprocesses the multi-component signal measurements and borehole size logs. Such preprocessing can include adaptive low-pass filtering to remove high-frequency measurement noise and/or to correct for horn-effect at formation boundaries. In some cases, the boundary horns may be removed or reduced using some combined logs as described in U.S. Pat. No. 6,819,112, titled "Method of combining vertical and horizontal magnetic dipole induction logs for reduced shoulder and borehole effects" by inventors Gianzero and Gao.

In optional block 608, the system tentatively locates bed boundaries. (Blocks 608 and 610 may be omitted for systems and methods using homogeneous "OD" model inversion in block 614.) Bed boundary detection can be performed in a number of ways, including peak detection to identify horn effects, signal processing to generate a boundary crossing signal, or a so-called "fast" inversion. Fast inversion employs a formation model having a smaller parameter space to trade off accuracy for speed. One illustrative model is the "Radial 1D" model, which assumes that the tool measurements are derived from a borehole through an otherwise homogeneous, infinite formation. Some embodiments of the model may account for eccentering of the tool and/or the presence of an invasion zone around the borehole. Another illustrative model is the "Vertical 1D" model, which assumes that the tool measurements are derived from a vertical borehole through a sequence of horizontal formation beds each having a corresponding (isotropic) resistivity. Such models yield a prediction of relatively constant resistivity within beds, the transitions between such regions of relatively constant resistivity then representing the locations of bed boundaries.

Given the number of parameters to be determined in the high-accuracy inversion, it is generally impractical to invert all of the measurements at once. Consequently, a moving window may be employed in optional block 610 to limit the measurements being inverted to those from the area around that region of the formation whose model parameters are being determined at that time. For subsequent regions of the formation, the moving window is shifted accordingly. The size of the window may be predetermined, either in terms of the distance it extends in each direction from the region, or in terms of the number of beds it extends in each direction from the current bed. The tentative bed boundaries from block 608 may be used for this bed-based window size determination as well as for setting an initial starting point of the high-accuracy inversion.

In block 614, the system performs a high-accuracy inversion using an anisotropic formation model having parameters that include at least dip, horizontal and vertical resistivity, and horizontal and vertical permittivity. The high-accuracy inversion may employ models that are homogeneous ("OD"), that account for radial variation ("Radial 1D"), that account for axial variation ("Vertical 1D"), that account for radial and axial variation ("2D"), or that account for radial, axial, and azimuthal variation ("3D"). Consequently, other suitable parameter values determined by the inversion may include borehole fluid resistivity, borehole diameter, invaded region resistivity, invaded region diameter, tool eccentricity (distance and direction), bed boundary positions, and dip azimuth. The resistivity and permittivity may be expressed in various equivalent forms including, e.g., complex horizontal conductivity and separate anisotropy ratios that relate the real and imaginary portions of the complex horizontal conductivity to the corresponding portions of the complex vertical conductivity. The parameters vary with position, though bed-based models may presume that within each bed the parameter values are constant.

The inversion process adjusts these model parameters (as well as the tentative bed boundary locations in bed-based models) adaptively to find the parameter values that minimize a cost function. Representing the set of measurements $\sigma_{ij}^l$ at a given position p as $m_k(p)$, where k is an index ranging from 1 to K to represent each combination of receive antenna orientation i, transmit antenna orientation j, spacing index value l, and optionally each frequency f, the cost function can be expressed:

$$C(p) = \sum_{q=-Q,+Q} \sum_{k=1,K} \|w_q \cdot [s_k(p-q) - m_k(p-q)]\|^2 \qquad (8)$$

where $s_k(p)$ is the measurement predicted by the model based on the current model parameters, and the weights $w_q$ provide a symmetric window of width 2Q+1 around the current position p. Suitable window shapes implementable by the weights include rectangular, triangular, Hamming, Hanning, and Blackman. It is noted here that the cost function (8) is just an example. Any other analytical function comparing predicted and actual measurements can be used. Cost function selection is typically done based on the topology of the measurement space and measurement error characteristics.

Again, the inversion process is the determination of those model parameters that minimize the cost function. This initial estimate of parameter values may be based on the optional fast inversion results from block 608.

In at least some preferred embodiments, the measurements $\sigma_{ij}^1$ being inverted in block 614 correspond to a single signal frequency f as experiments have indicated that such a measurement set would be sufficient for estimating the anisotropic permittivity and resistivity parameters of a formation. However, at least some contemplated embodiments perform simultaneous inversion of measurements at each of the multiple signal frequencies employed by the tool to determine dispersion curves of at least the anisotropic resistivity and anisotropic permittivity parameters. Where single-frequency inversion is performed in block 614, optional block 616 may be included to repeat the high-accuracy inversion for each measurement frequency, thereby sequentially determining a frequency dependence of the anisotropic permittivity and resistivity parameters. In either case, the system may fit a model dispersion curve to the frequency dependences or may determine which of multiple candidate dispersion curves best fits the frequency dependences of the anisotropic permittivity and resistivity parameters. The model or candidate curves may be based on a general dispersive model such as Cole-Cole or Cole-Davidson, or may be based on a model specific to dielectric relaxation losses.

In block 618, the system translates the dispersion curves and/or individual anisotropic permittivity and resistivity parameter values into predictions of the characteristics of the formation fluid and matrix. Such characteristics may include fluid saturation (e.g., a volume or percentage of water in the formation), rock ("matrix") type (e.g., sandstone, shale), and presence of materials having significant Maxwell-Wagner polarization (e.g., pyrite, clay). Fluid saturation and porosity are characteristics that may be derived from horizontal formation resistivity. Rock type may be derived based on resistivity in combination with resistive anisotropy. The anisotropy ratio or index of permittivity indicates the presence of pyrite and other materials having anisotropic polarization.

In block 620, the system stores the inverted parameter values and the associated predictions, typically in the form of a parameter log. In block 622, the system determines whether all of the tool measurements have been processed, and if not, the process returns to block 610 to adjust the position of the window and repeat blocks 614-622. Once processing is complete, the system displays a visual representation of the logs to a user in block 624. The user may interpret the logs to determine completion and production strategies, as well as to optimize further drilling in the same or other nearby boreholes.

Embodiments disclosed herein include:

A: A logging method that comprises: obtaining multi-component signal measurements from an electromagnetic logging tool conveyed along a borehole through a formation; inverting the multi-component signal measurements for at least a single frequency using an anisotropic formation model having at least dip, horizontal and vertical resistivity, and horizontal and vertical permittivity, as inversion parameters; and providing a log for said formation, the log representing a position dependence of at least one of said parameters or a formation property derived from at least one of said parameters.

B: A logging system that comprises: an electromagnetic logging tool that acquires multi-component signal measurements as the tool is conveyed along a borehole through a formation; and a processing system that provides a log of the formation log by inverting the multi-component signal measurements for at least one frequency using an anisotropic formation model having at least dip, horizontal and vertical resistivity, and horizontal and vertical permittivity, as inversion parameters.

C: A nontransient information storage medium having software that, when executed by a processing system, causes the processing system to perform the method of Embodiment A.

Each of the embodiments A, B, and C may have one or more of the following additional elements in any combination: Element 1: providing the log includes displaying the log in visual form. Element 2: providing the log includes storing the log in a non-transient information storage medium for later analysis. Element 3: the log represents an estimated water saturation that is based at least in part on one or more of the horizontal and vertical resistivity, and horizontal and vertical permittivity. Element 4: the log represents a rock type based at least in part on one or more of the horizontal and vertical resistivity, and horizontal and vertical permittivity. Element 5: the log represents a rock type based at least in part on a ratio of the horizontal and vertical permittivity. Element 5: the multi-component signal measurements for a single frequency include measurements acquired with at least two different relative orientations between transmit and receive antennas. Element 6: the method further includes: using the anisotropic formation model to perform separate inversions of multi-component signal measurements at each additional frequency; and identifying a dispersion model that represents a frequency dependence of said parameters. Element 7: the log represents a rock type based at least in part on the representative dispersion model. Element 8: the electromagnetic logging tool is a logging-while-drilling tool. Element 9: the electromagnetic logging tool is a wireline tool. Element 10: the electromagnetic logging tool includes one or more tilted antennas for acquiring the multi-component signal measurements. Element 11: the measurements are acquired by at least one tilted receiver antenna's response to at least one tilted transmitter antenna.

Numerous other modifications, equivalents, and alternatives, will become apparent to those skilled in the art once the above disclosure is fully appreciated. It is intended that the following claims be interpreted to embrace all such modifications, equivalents, and alternatives where applicable.

What is claimed is:

1. A logging method that comprises:
   obtaining multi-component signal measurements from an electromagnetic logging tool conveyed along a borehole through a formation, wherein the multi-component signal measurements for a single signal frequency include measurements acquired with at least two different relative orientations between a tilted transmit and a collocated tilted receive antenna;
   employing a moving window to limit the multi-component signal measurements for inversion; using the anisotropic formation model to perform separate inversions of multi-component signal measurements at the single signal frequency; identifying one or more dispersion curves in a dispersion model, wherein each of the one or more dispersion curves represent an anisotropic resistivity or an anisotropic permittivity based on a frequency dependence; and inverting the multi-component signal measurements that are limited by the moving window for at least one frequency using an anisotropic formation model having inversion parameters of at least dip, horizontal and vertical resistivity, and horizontal and vertical permittivity.

2. The method of claim 1, wherein horizontal and vertical resistivity, and horizontal and vertical permittivity inversion parameters are calculated from a single spacing, the single signal frequency, multiple orientation measurement.

3. The method of claim 1, further includes providing a log for said formation, the log representing a position dependence of at least one of said parameters or a formation property derived from at least one of said inversion parameters.

4. The method of claim 3, wherein said providing includes displaying the log in visual form.

5. The method of claim 3, wherein said providing includes storing the log in a non-transient information storage medium for later analysis.

6. The method of claim 3, wherein the log represents an estimated water saturation that is based at least in part on one or more of said horizontal and vertical resistivity, and horizontal and vertical permittivity.

7. The method of claim 3, wherein the log represents a rock type based at least in part on the horizontal and vertical resistivity, and horizontal and vertical permittivity.

8. The method of claim 1, wherein dispersion model includes both resistivity and dielectric constant variable as a function of frequency.

9. The method of claim 1, wherein the log represents a rock type based at least in part on the representative dispersion model.

10. A logging system that comprises:
an electromagnetic logging tool that acquires multi-component signal measurements as the tool is conveyed along a borehole through a formation;
one or more tilted transmit antenna connected to the electromagnetic logging tool;
a collocated tilted receive antenna for acquiring the multi-component signal measurements connected to the electromagnetic logging tool; and
a processing system that identifies one or more bed boundaries, employs a moving window to limit the multi-component signal measurements for inversion, and provides a log of the formation log by inverting the multicomponent signal measurements that are limited by the moving window for at least one frequency using an anisotropic formation model having inversion parameters of at least dip, horizontal and vertical resistivity, and horizontal and vertical permittivity;
using the anisotropic formation model to perform separate inversions of multi-component signal measurements at a single signal frequency; and
identifying a dispersion model that represents a frequency dependence of said parameters.

11. The system of claim 10, wherein the electromagnetic logging tool is a logging-while-drilling tool.

12. The system of claim 10, wherein the log is produced at least in part based on the response at the said collocated tilted receive antenna due to said one or more tilted transmit antennas.

13. The system of claim 10, wherein the electromagnetic logging tool is a wireline logging tool.

14. The system of claim 10, wherein the system displays the log in visual form.

15. The system of claim 10, wherein the system stores the log in a non-transient information storage medium for later analysis.

16. The system of claim 10, wherein the log represents an estimated water saturation that is based at least in part on one or more of said horizontal and vertical resistivity, and horizontal and vertical permittivity.

17. The system of claim 10, wherein the log represents a rock type based at least in part on one or more of said horizontal and vertical resistivity, and horizontal and vertical permittivity.

18. The system of claim 10, wherein the multi-component signal measurements for one frequency include measurements acquired with at least two different relative orientations between the one or more tilted transmit antenna and the collocated tilted receive antenna.

19. The sytem of claim 10, wherein the log represents a rock type based at least in part on the representative dispersion model.

* * * * *